3,150,120
GRAMOPHONE RECORDS OF VINYL CHLORIDE POLYMERS WITH QUATERNARY PYRIDINIUM COMPOUNDS AS ANTI-STATIC AGENTS

Lyle Eugene Perrins, St. Albans, England, assignor to Imperial Chemical Industries Limited, London, England, a corporation of Great Britain
No Drawing. Filed July 13, 1961, Ser. No. 123,648
Claims priority, application Great Britain July 20, 1960
8 Claims. (Cl. 260—87.1)

This invention relates to a process for the production of improved polymers and copolymers of vinyl chloride.

The production of materials having antistatic properties is well known but hitherto the addition of the compounds donating antistatic properties has been carried out in general by some form of mechanical intermixing with the polymer after the polymerization process. Many quaternary pyridinium compounds are available commercially as waxy or greasy solids and/or crystalline powders with low softening or melting points. The mixing of such compounds with solid polymer particles, particularly if elevated temperatures are encountered during the mixing operations, has often proven difficult owing to their stickiness and poor flow properties which lead to clogging of moving parts and adherence to container walls. Also in many cases, the products themselves are sticky and have poor handling characteristics creating difficulty in further processing. It is an object of this invention to provide a process whereby such quaternary pyridinium compounds can be incorporated in polymeric materials with compartaive ease to provide products with adequate antistatic properties and good handling characteristics.

According to the present invention I provide a process in which vinyl chloride is polymerised alone with other copolymerizable monomers in aqueous medium in the presence of at least 0.02% by weight of the monomer or monomers to be polymerized of a quaternary pyridinium compound in which the substituent on the nitrogen atom is an alkyl or alicyclyl group containing at least 7 carbon atoms and in which one or more of the hydrogen atoms attached to the carbon atoms of the pyridine ring may or may not be replaced by alkyl groups. Also according to my invention I provide polymers whenever prepared by this process.

The antistatic properties of the product are most effectively improved when there is at least 0.1% by weight of the pyridinium compound present and I prefer to use from 0.1% to 5% because beyond 5% there is no substantial improvement in the antistatic properties of the composition. However, greater amounts may be used if desired and the resulting composition mixed with a predetermined amount of untreated polymer to give any desired concentration of pyridinium compound in the resultant mixture.

Although it is feasible to use very much greater quantities of the pyridinium compound in the polymer, compositions containing more than 15% tend to suffer in their handling characteristics.

When there is not intention to mix the product with further polymeric material before processing, we prefer the concentration of pyridinium compound to be not more than 4% by weight since greater quantities may have a deleterious effect on the properties of the product made by moulding the polymer. Similarly where a composition of high (i.e. greater than 4%) pyridinium compound concentration is mixed with further untreated polymeric material, I prefer the resultant mixture to have a final concentration of not more than 4%.

Examples of the nitrogen substituents of the quaternary pyridinium salt include heptyl, octyl, nonyl, decyl groups and the like. The carbon atoms of the pyridine ring may be substituted by for example, methyl, ethyl, propyl, butyl and the like alkyl groups. Examples of anions that may form part of the salt include halides, particularly chloride and bromide, sulphate, nitrate and phosphate.

Examples of my quaternary pyridinium salts are heptyl pyridinium chloride, dodecyl pyridinium bromide, dodecyl pyridinium sulphate, cetyl pyridinium chloride, cetyl pyridinium bromide, cetyl pyridinium iodide, octadecyl pyridinium bromide, and tetra-decyl picolinium halides. The cetyl pyridinium compounds, particularly the halides and especially the chloride are preferred since they are non-toxic and do not affect the moulding properties of the final polymer.

Examples of monomers copolymerisable with vinyl chloride incluude vinyl acetate, acrylonitrile, methacrylonitrile, methyl methacrylate, methyl acrylate, 2-ethyl hexyl acrylate, methyl-2-chloro-acrylate, maleic acid, diethyl maleate, fumaric acid, diethyl fumarate, vinylidene chloride, acrylic acid and the like.

Polymerization of vinyl chloride in aqueous medium can be carried out by any of the well-known techniques and polymerization may be by batch, continuous or semi-continuous operation.

When an emulsion process is used for the polymerization in which the monomer is polymerized while dispersed in water and in the presence of a water-soluble catalyst, the pyridinium compound acts as an emulsifying agent as well as donating properties to the final product. The addition of the emulsifying agent to the system may be effected in one step or in any number of steps or continuously during the course of at least part of the remainder of the polymerization after the initial introduction. It is preferred to keep the concentration of emulsifying agent at all stages of the polymerization as low as possible without coagulation occurring and this may best be achieved by adding the agent stepwise or in a continuous manner. If the final latex prepared in this way does not have the required stability, this may be remedied by adding further emulsifying agents towards the end of the polymerization just before venting the autoclave of unreacted monomer. This may be necessary for example when it is desired to separate the polymer from the latex by spray drying or to increase the amount of pyridinium compound in the final polymer (e.g. for use in master batching). If desired, further amounts of pyridinium compounds may be added to the polymer suspension after venting.

Any of the usual water soluble catalysts and antifoam agents may be used in the process. For example, catalysts that may be used for this process include peroxy compounds such as hydrogen peroxide, per-esters such as sodium peracetate and alkali metal and ammonium persulphates. The catalysts may if desired be used in conjunction with known activating materials. For example, the polymerization may be carried out in the presence of hydrogen peroxide activated by a water soluble salt of a heavy metal such as copper or iron, or in the presence of a persulphate activated by a water-soluble copper salt. In the second case, the polymerization may be carried out additionally in the presence of a small partial pressure of oxygen.

Typical antifoam agents that may be used are the silicones.

Additional quantities of monomeric material may be added as the polymerization proceeds if desired.

The polymerization may also be carried out using a monomer-soluble catalyst such as lauroyl peroxide, for example, and when this process is used it is preferably in conjunction with a homogenizer as homogenizing is instrumental in producing a stable latex.

The polymer produced by these processes may be dried by spray-, drum-, or tray-drying techniques or any other well known techniques for drying. Common additives such as plasticizers, pigments, fillers and heat and light stabilizers may be used to modify the polymer and the product may be used in the production of coatings, films and other shaped articles by moulding, extruding, calendering, solvent-casting and other processes of treatment and fabrication commonly applied to vinyl chloride polymers. The polymers may also be compounded or blended with any other polymeric materials. The polymers are particularly useful for the fabrication of moulding powders.

My invention is particularly useful for the production of compositions incorporating antistatic agents which are normally commercially available as waxy or greasy solids and/or crystalline powders with low melting or softening points. Adding the antistatic agent during the polymerization avoids the difficulties normally associated with mixing these compounds and gives a product which is easily handled and processed whereas the products of mechanically mixing polymer particles with such compounds at a post-polymerization stage are often sticky and tend to clog apparatus through which they pass.

My invention is particularly useful in respect of the vinyl chloride/vinyl acetate copolymers which are used for making gramophone records. Records produced from compositions according to our present invention are shown in general to have remarkably uniform properties owing to the good distribution of the antistatic agent caused by incorporating it in the polymerization process.

My invention is illustrated, but in no way limited, by the following examples in which all parts are expressed as parts by weight.

Example I

| | |
|---|---|
| Distilled water | 129.5 parts. |
| 100 vol. hydrogen peroxide | 0.69 part. |
| Silicone antifoam agent | 0.008 part. |
| Emulsifier (cetyl pyridinium chloride): | |
| Solution (a) | 0.3 part dissolved in 25.8 parts of water. |
| Solution (b) | 0.785 part dissolved in 17.3 parts of water. |
| Vinyl chloride | 100 parts. |
| Vinyl acetate | 20.7 parts. |

The water, hydrogen peroxide and antifoam agent were charged into an autoclave which was then purged free of oxygen by pressurizing the vessel to 50 p.s.i. with nitrogen three times and venting after each time to atmospheric pressure. The autoclave was then heated to 67° C. and the mixture stirred. The mixed monomers were fed in at such a rate that a pressure of 100 p.s.i. was maintained in the autoclave. Simultaneously the pyridinium solution (a) was added at a rate proportional to the feed rate of the monomers.

When all the monomeric material had been added and shortly before the pressure in the vessel dropped to 50 p.s.i. the pyridinium solution (b) was added. The batch was vented when the pressure dropped to 50 p.s.i. The latex was spray dried and a gramophone record made from the polymer was rubbed with a woolen cloth and held just above a dish of finely divided cigarette ash. No ash was picked up by the record which showed excellent antistatic properties.

Example II

| | |
|---|---|
| Distilled water | 155 parts. |
| 100 vol. hydrogen peroxide | 0.386 part. |
| Silicone antifoam agent | 0.0077 part. |
| Emulsifier (tetradecyl pyridinium bromide): | |
| Solution (a) | 0.302 part dissolved in 25.8 parts distilled water. |
| Solution (b) | 0.785 part dissolved in 17.3 parts distilled water. |
| Vinyl chloride | 100 parts. |
| Vinyl acetate | 20.7 parts. |

The water, hydrogen peroxide and antifoam agent were charged into an autoclave which was then purged free of oxygen in the same manner as described in Example I. The monomeric material was then charged and the autoclave was stirred and heated to 67° C. Solution (a) was fed in uniformly over 2½ hours and when the pressure reached 50 p.s.i. solution (b) was added and after stirring for a short period the batch was vented.

The latex was spray dried and articles moulded from the powder showed good antistatic properties.

Similar results may be obtained using dodecyl pyridinium sulphate.

Example III

The procedure of Example II was repeated using

| | |
|---|---|
| Distilled water | 128.3 parts. |
| 100 vol. hydrogen peroxide | 0.318 part. |
| Silicone antifoam agent | 0.00638 part. |
| Emulsifier (tetradecyl pyridinium bromide): | |
| Solution (a) | 0.25 part dissolved in 21.4 parts of distilled water. |
| Solution (b) | 0.65 part dissolved in 14.3 parts of distilled water. |
| Vinyl chloride | 100 parts. |

The latex was spray dried to give a dry, free-flowing powder showing good antistatic properties.

Example IV

The procedure of Example II was repeated using

| | |
|---|---|
| Distilled water | 150 parts. |
| 100 vol. hydrogen peroxide | 1.122 parts. |
| Silicone antifoam agent | 0.00744 part. |
| Emulsifier (cetyl pyridinium bromide): | |
| Solution (a) | 0.292 part dissolved in 24.9 parts of distilled water. |
| Solution (b) | 0.758 part dissolved in 16.7 parts of distilled water. |
| Vinyl chloride | 100 parts. |
| Ethyl acrylate | 16.68 parts. |

The latex was spray-dried to give a dry, free-flowing powder showing good antistatic properties.

Example V

The procedure of Example II was repeated using

| | |
|---|---|
| Distilled water | 128.3 parts. |
| 100 vol. hydrogen peroxide | 0.318 part. |
| Silicone antifoam agent | 0.00638 part. |

Emulsifier (tetradecyl pyridinium bromide):
  Solution (a) _____ 0.25 part dissolved in 21.4 parts of distilled water.
  Solution (b) _____ 0.65 part dissolved in 14.3 parts of distilled water.
Vinyl chloride _____ 100 parts.

The latex was spray-dried to give a dry, free-flowing powder showing good antistatic properties.

When the process is repeated using tetradecyl picolinium bromide, similar results are obtained.

I claim:

1. A gramophone record having antistatic properties and formed from thermoplastic polymeric material having thoroughly dispersed therethrough from 0.2 to 4% based on the weight of the polymeric material, of a quaternary pyridinium compound selected from the group consisting of salts of strong acids having the structure:

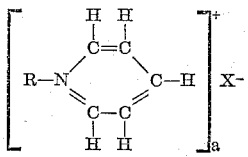

and substituted derivatives of these salts where at least one of the hydrogen atoms of the pyridine nucleus is substituted by an alkyl group, where R is an alkyl radical containing at least 7 carbon atoms, X is an anion and $a$ is an integer equal to the valency of X characterized in that the thermoplastic polymeric material is prepared by polymerizing vinyl chloride and 0 to about 20% by weight of the vinyl chloride of vinyl acetate together in aqueous medium in the presence of said quaternary pyridinium compound and a free radical polymerization catalyst.

2. A gramophone record according to claim 1 in which the quaternary pyridinium compound is a cetyl pyridinium salt.

3. A gramophone record according to claim 2 in which the quaternary pyridinium compound is a cetyl pyridinium halide.

4. A gramophone record according to claim 3 in which the quaternary pyridinium compound is cetyl pyridinium chloride.

5. A gramophone record having antistatic properties and formed from thermoplastic polymeric material and from 0.2 to 4% based on the weight of the thermoplastic polymeric material of a quaternary pyridinium compound selected from the group consisting of salts of strong acids having the structure:

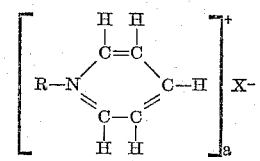

and substituted derivatives of these salts where at least one of the hydrogen atoms of the pyridine nucleus is substituted by an alkyl group, where R is an alkyl radical containing at least 7 carbon atoms, X is an anion and $a$ is an integer equal to the valency of X characterized in that the thermoplastic material comprises (a) the polymerization product of vinyl chloride and 0 to about 20% by weight based on the weight of the vinyl chloride of vinyl acetate prepared by copolymerizing vinyl chloride and vinyl acetate together in aqueous medium, in the presence of a free radical polymerization catalyst and more than 4% but not more than 15% by weight of the monomers of the said quaternary pyridinium compound, and (b) polyvinyl chloride.

6. A gramophone record according to claim 5 in which the quaternary pyridinium compound is a cetyl pyridinium salt.

7. A gramophone record according to claim 6 in which the quaternary pyridinium compound is a cetyl pyridinium halide.

8. A gramophone record according to claim 7 in which the quaternary pyridinium compound is a cetyl pyridinium chloride.

References Cited in the file of this patent

UNITED STATES PATENTS 2,674,593   Condo et al. _____ Apr. 6, 1954
3,071,818   Mura et al. _____ Jan. 8, 1963

OTHER REFERENCES

Schildknecht: Vinyl and Related Polymers, page 437, Wiley, 1952.

Moilliet et al.: Surface Activity, 2nd edition, pages 456–460, Van Nostrand, 1961.